United States Patent [19]
Motegi

[11] Patent Number: 6,160,558
[45] Date of Patent: *Dec. 12, 2000

[54] ANIMATION CREATING METHOD AND SYSTEM, AND ANIMATION REPRODUCING METHOD AND SYSTEM

[75] Inventor: Kunio Motegi, Inagi, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/035,857

[22] Filed: Mar. 6, 1998

[30] Foreign Application Priority Data

Mar. 6, 1997 [JP] Japan .................................. 9-051357

[51] Int. Cl.[7] .................................................. G06T 15/70
[52] U.S. Cl. .......................... 345/473; 345/474; 345/475
[58] Field of Search .................................... 345/473, 474, 345/475

[56] References Cited

U.S. PATENT DOCUMENTS 5,657,247  8/1997  Danial et al. ............................ 345/473
5,767,845  6/1998  Oashi et al. ............................. 345/475

FOREIGN PATENT DOCUMENTS

61-008758  1/1986  Japan.
7-327214  12/1995  Japan.

*Primary Examiner*—Mark Zimmerman
*Assistant Examiner*—Kimbinh T. Nguyen
*Attorney, Agent, or Firm*—Staas & Halsey LLP

[57] ABSTRACT

Disclosed are an animation creating method and system for creating an executive scenario of animation while reducing a load to be imposed by animation reproduction, and an animation reproducing method and system for reproducing the executive scenario. A scenario described in the form of paired data including identifiers of frame data items and reproduction tempos is input. When frame data items are reproduced at intervals of a designated unit reproduction time, the number of frame data items needed to realize each reproduction tempo is calculated. An identifier of a frame data item associated with the reproduction tempo is copied so that the same number of identifiers as the calculated number of frame data items can be produced. Thus, an executive scenario composed of a series of frame data items is created. It is then detected whether or not the cycle of the unit reproduction time has elapsed. Every time it is detected that the cycle has elapsed, an identifier of a frame data is retrieved in order from the executive scenario, and a frame data item indicated by the identifier of a frame data item is displayed.

8 Claims, 7 Drawing Sheets

ANIMATION CREATING METHOD AND SYSTEM, AND ANIMATION REPRODUCING METHOD AND SYSTEM

BACKGROUND OF THE INVENTION

1. Field of the Invention

The present invention relates to an animation creating method and system for creating an executive scenario of animation while reducing a load to be imposed on animation reproduction, and to an animation reproducing method and system for reproducing the executive scenario of animation created by the animation creating method and system.

2. Description of the Related Art

An animation creating method and system create a scenario of animation, and an animation reproducing method and system reproduce an animation by displaying frame data items (image data items) successively on a display unit according to the created scenario of animation.

The scenario of animation is described in the form of paired data including identifiers of frame data items and reproduction tempos of the frame data items or tempos at which the frame data items should be reproduced.

An animation creating method and system according to a related art is such that a scenario of animation described in the form of paired data including identifiers of frame data items and reproduction tempos of the frame data items is created according to the definition of a scenario of animation.

In line with the animation creating method and system according to the related art, an animation reproducing method and system according to the related art is such that: paired data including an identifier of a frame data item and a reproduction tempo of the frame data item is retrieved from the created scenario of animation; a frame data item indicated by the identifier is read from a memory and displayed on a display unit; the passage of a time interval defined by the reproduction tempo is monitored; when the passage of the time interval is detected, the next paired data is retrieved; and this sequence is repeated in order to reproduce an animation.

However, according to the related art, there is a problem that when a plurality of animations are reproduced concurrently, the load imposed by the reproduction is very large.

In other words, when a plurality of animations are reproduced concurrently according to a plurality of scenarios, since the reproduction tempos described in the scenarios are mutually different, the passage of a time interval relative to which the reproduction tempos are determined and which is different from scenario to scenario must be monitored for each scenario. This poses a problem that the load imposed by the reproduction gets larger.

SUMMARY OF THE INVENTION

An object of the present invention is to provide an unprecedented animation creating method and system for creating an executive scenario of animation so as to reduce the load imposed by animation reproduction, and to provide an unprecedented animation reproducing method and system for reproducing the executive scenario of animation created by the animation creating method and system.

For accomplishing the above object, according to the first aspect of the present invention, there is provided an animation creating method for creating an executive scenario of animation comprising the steps of: (a) inputting a scenario of animation described in the form of at least paired data including identifiers of frame data items constituting an animation and reproduction tempos of the frame data items or tempos at which the frame data items should be reproduced; (b) calculating, for each of the identifiers of frame data items described in the scenario input at step (a), the number of frame data items needed to realize a reproduction tempo paired with the identifier according to a designated unit time required for reproducing frame data; and (c) creating an executive scenario of animation composed of at least a series of identifiers of frame data items by producing, for each of the identifiers of frame data items described in the scenario input at step (a), the same number of identifiers of frame data items as the number of frame data items calculated at step (b).

According to the second aspect of the present invention, there is provided an animation reproducing method for reproducing an executive scenario of animation composed of at least a series of identifiers of frame data items, comprising the steps of: (a) detecting whether or not a cycle of a designated unit time required for reproducing frame data has elapsed; (b) when it is judged at step (a) that the cycle of the designated unit time required for reproducing frame data has elapsed, retrieving an identifier of a frame data item in order from the executive scenario; and (c) giving control so that a frame data item indicated by the identifier of a frame data item retrieved at step (b) can be displayed on a display unit.

Moreover, according to the present invention, there is provided systems in which the foregoing methods are implemented. Moreover, according to the present invention, there is provided a recording medium readable by the systems and storing programs for implementing the methods.

BRIEF DESCRIPTION OF THE DRAWINGS

Further features and advantages of the present invention will be apparent from the following description with reference to the accompanying drawings, in which.

DESCRIPTION OF THE PREFERRED EMBODIMENTS

Figure 1:
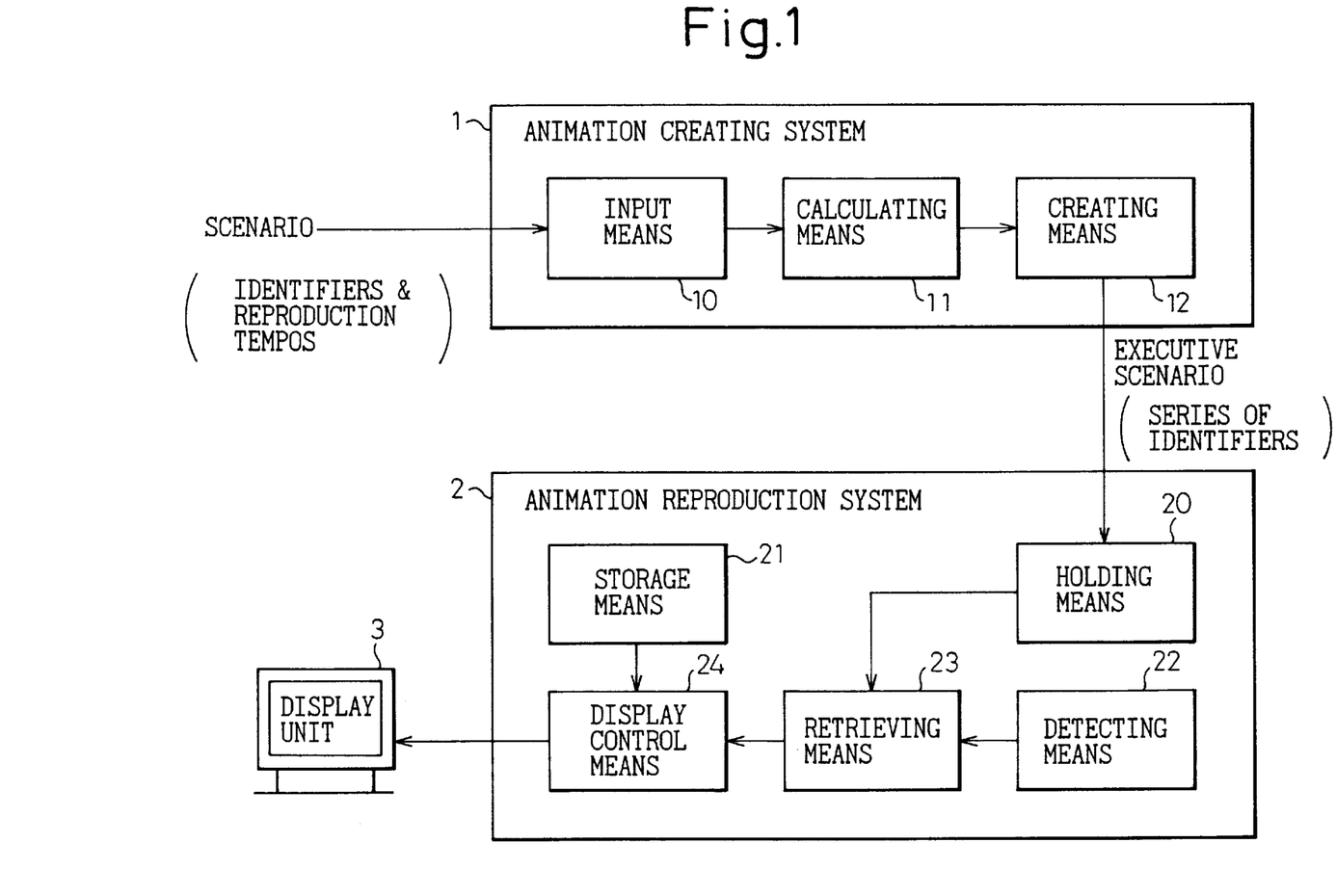
FIG. 1 is a diagram showing a configuration based on the principles of the present invention.

To begin with, a configuration based on the principles of the present invention will be described in conjunction with FIG. 1.

In the drawing, there are shown an animation creating system 1 in accordance with the present invention for creating an executive scenario of animation, an animation reproducing system 2 in accordance with the present invention for reproducing an animation according to the executive scenario of animation created by the animation creating system 1, and a display unit 3 included in the animation reproducing system 2 for displaying the animation reproduced by the animation reproducing system 2.

The animation creating system 1 includes an input means 10 for inputting a scenario of animation described in the form of at least paired data including identifiers of frame data items and reproduction tempos of the frame data items or tempos at which the frame data items should be reproduced, a calculating means 11 for calculating, for each of the identifiers of frame data items described in the scenario input by the input means 10, the number of frame data items needed to realize a reproduction tempo paired with the identifier, and a creating means 12 for creating an executive scenario of animation composed of a series of identifiers of frame data items according to the number of frame data items calculated by the calculating means 11.

In contrast, the animation reproducing system 2 includes a holding means 20 for holding the executive scenario of animation created by the animation creating system 1, a storage means 21 for storing frame data items in one-to-one correspondence with identifiers, a detecting means 22 for detecting whether or not a cycle of a designated unit time required for reproducing frame data has elapsed, a retrieving means 23 for retrieving an identifier of a frame data item orderly from the executive scenario held by the holding means, and a display control means 24 for controlling display on the display unit of a frame data item indicated by the identifier of a frame data item retrieved by the retrieving means 23.

In the animation creating system 1 having the foregoing components, when the input means 10 inputs a scenario of animation described in the form of paired data including identifiers of frame data items and reproduction tempos of the frame data items, the calculating means 11 calculates, for each of the identifiers of frame data items described in the input scenario, the number of frame data items needed to realize a reproduction tempo paired with the identifier according to the designated unit time required for reproducing frame data items.

In response to the number of data frames, the creating means 12 produces, for each of the identifiers of frame data items described in the scenario input by the input means 10, the same number of identifiers of frame data items as the calculated number of frame data items, and thus creates an executive scenario of animation composed of a series of identifiers of frame data items.

On receipt of the thus created executive scenario of animation, the detecting means 22 in the animation reproducing system 2 in accordance with the present invention detects whether or not a cycle of the designated unit time required for reproducing frame data has elapsed. When it is detected that the cycle has elapsed, the retrieving means 23 retrieves an identifier of a frame data item in order from the executive scenario of animation created by the animation creating system 1. The display control means 24 gives control so that the frame data item indicated by the retrieved identifier of a frame data item can be displayed on the display unit 3. Thus, an animation is reproduced.

As mentioned above, according to the present invention, when animation reproduction is executed, all that is needed is to monitor whether or not the cycle of the designated unit time required for reproducing frame data has elapsed. Even when a plurality of animations must be reproduced concurrently, an increase in the load imposed by the reproduction can be suppressed.

The present invention will be explained in detail on the basis of an embodiment.

Figure 2:
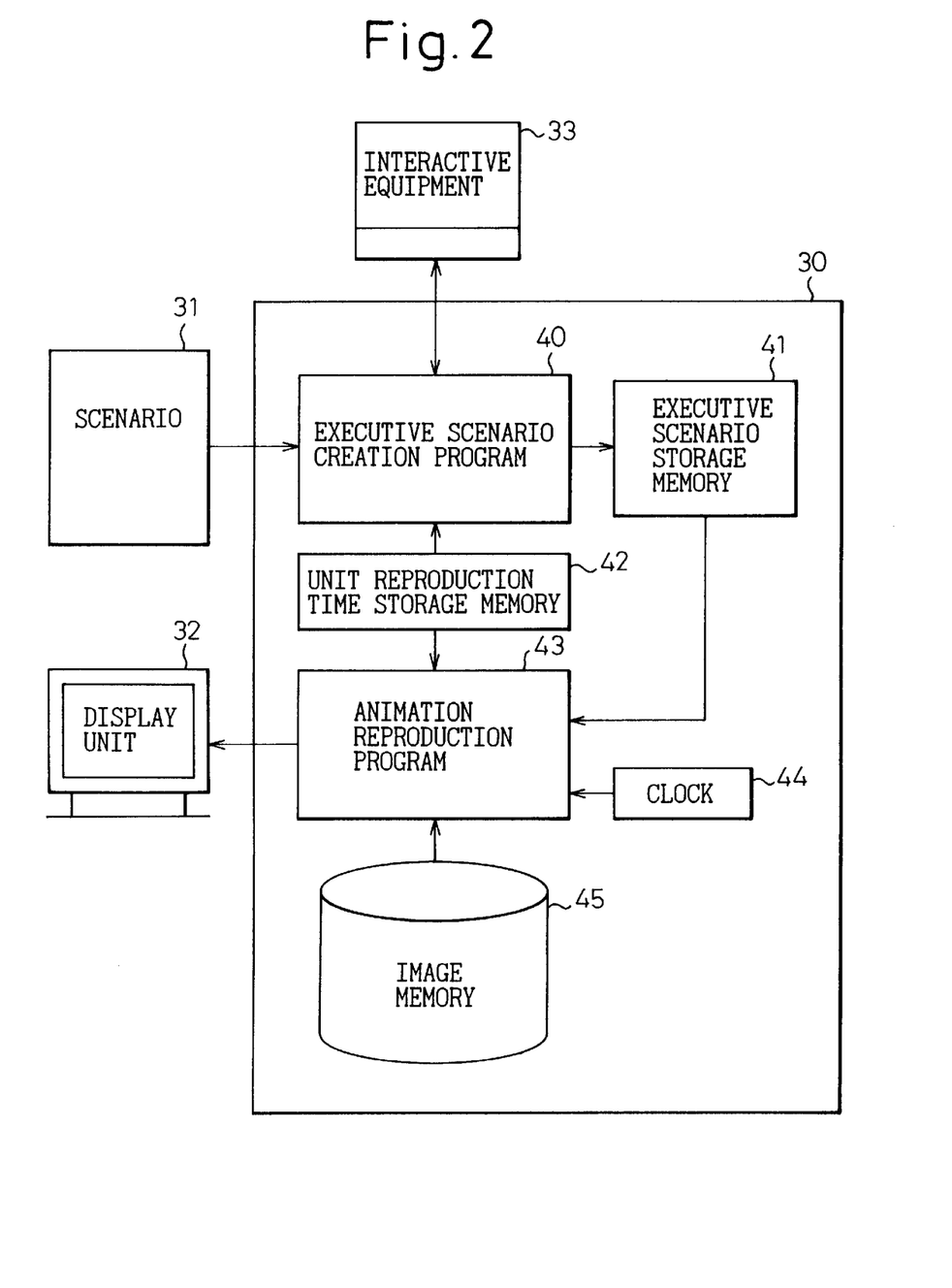
FIG. 2 is a diagram showing an embodiment of the present invention.

FIG. 2 shows a configuration in accordance with the embodiment of the present invention.

In the drawing, there is shown an animation processing system 30 in accordance with the present invention. The animation processing system inputs a scenario 31 of animation, creates an executive scenario of animation, reproduces an animation according to the executive scenario, and displays the animation on a display unit 32. An interactive equipment 33 is included in the animation processing system 30.

The animation processing system 30 comprises an executive scenario creation program 40 for creating an executive scenario, an executive scenario storage memory 41 for storing the executive scenario created by the executive scenario creation program 40, a unit reproduction time storage memory 42 for storing a unit time required for reproducing frame data which is needed to create an executive scenario, an animation reproduction program 43 for reproducing an animation according to the executive scenario and displaying it on the display unit 32, a clock 44, and an image memory 45.

The programs are loaded from various kinds of recording media into a main memory (not shown) inside the animation processing system 30 and then executed within the main memory.

Figure 3:
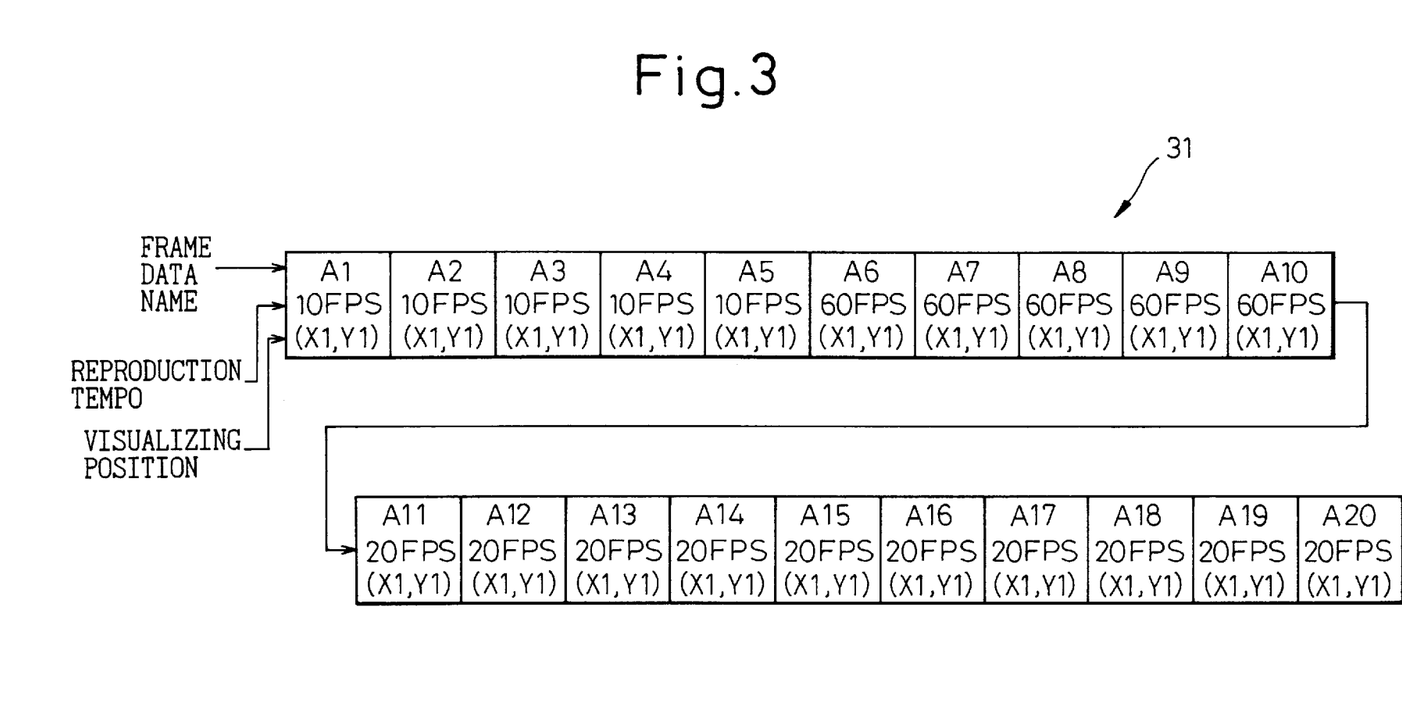
FIG. 3 is an explanatory diagram concerning a scenario.

The scenario 31 input to the animation processing system 30 is, as shown in FIG. 3, composed of data sets including names of frame data items (image data items) constituting an animation, reproduction tempos of the frame data items or tempos at which the frame data items should be reproduced, and visualizing positions of the frame data items or positions at which the frame data items should be visualized.

The scenario 31 of animation shown in FIG. 3 instructs that frame data items A1 to A5 should be displayed successively at a visualizing position (X1, Y1) at a reproduction tempo of 10 FPS, frame data items A6 to A10 should be displayed successively at the visualizing position (X1, Y1) at a reproduction tempo of 60 FPS, and frame data items A11 to A20 should be displayed successively at the visualizing position (X1, Y1) at a reproduction tempo of 20 FPS.

A reproduction tempo of 10 FPS means that frame data items are reproduced at a reproduction tempo of 10 frame data items per second. In other words, each frame data item is displayed for $\frac{1}{10}$ of a second. Moreover, a reproduction tempo of 60 FPS means that frame data items are reproduced at a reproduction tempo of 60 frame data items per second. In other words, each frame is displayed for $\frac{1}{60}$ of a second. Moreover, a reproduction tempo of 20 FPS means that frame data items are reproduced at a reproduction tempo of 20 frame data items per second. In other words, each frame is displayed for $\frac{1}{20}$ of a second.

Figure 4:
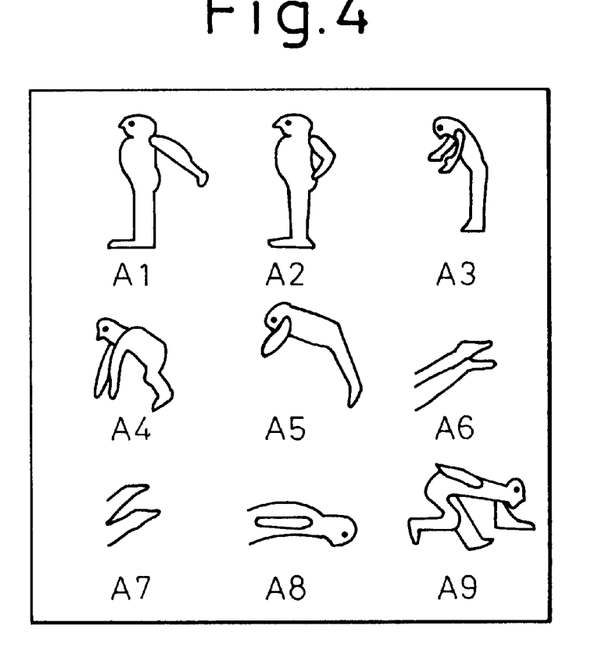
FIG. 4 is a diagram showing a data structure in an image memory.

The image memory 45 stores, as shown in FIG. 4, frame data items constituting an animation in one-to-one correspondence with the names.

Figure 5:
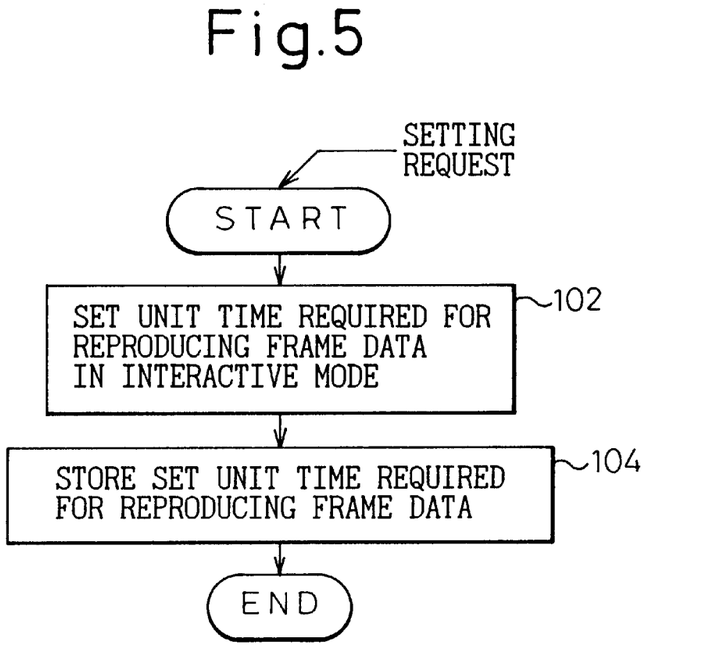
FIG. 5 is a flowchart describing a procedure of reproduction time setting to be executed by an executive scenario creation program.
Figure 6:
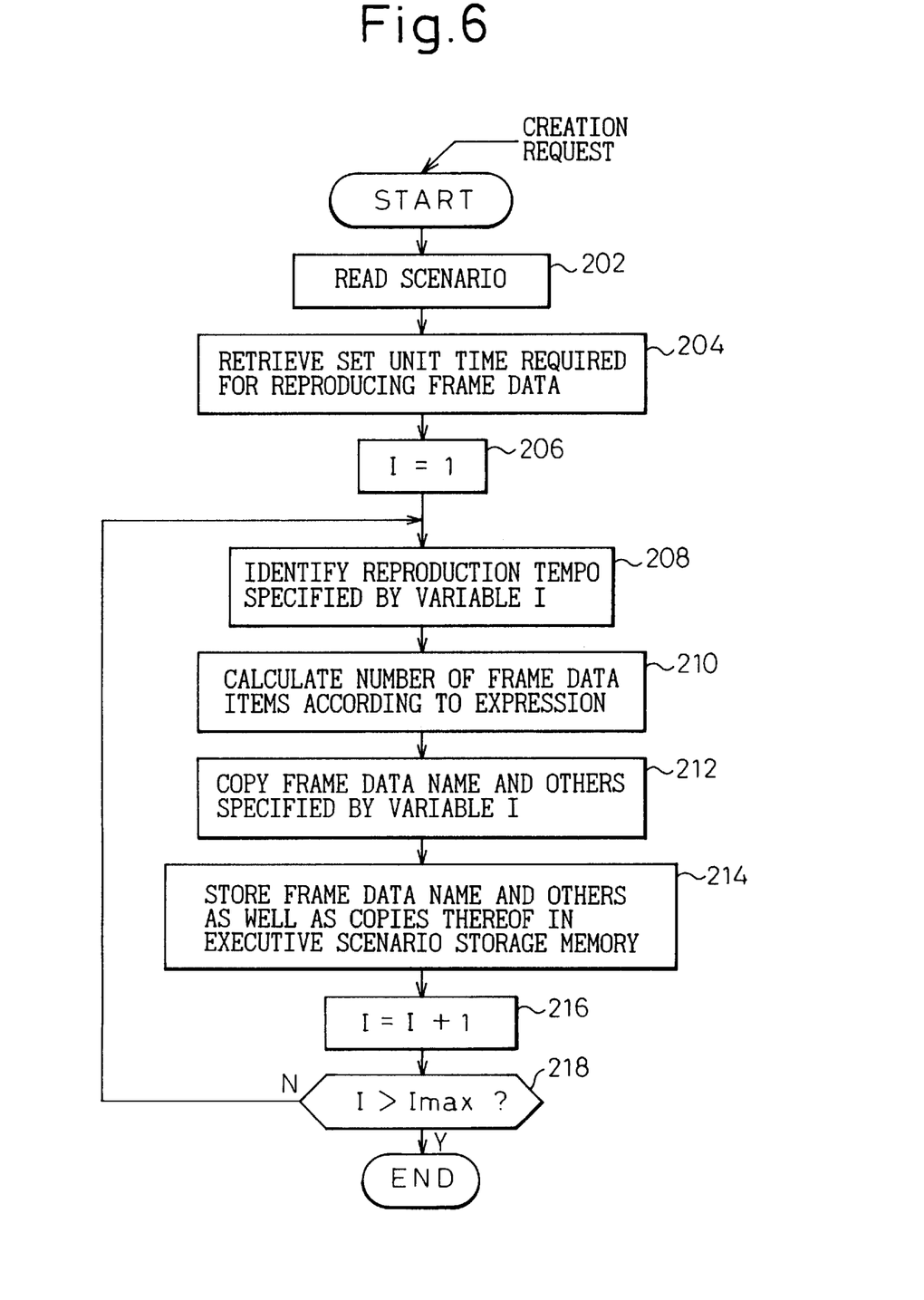
FIG. 6 is a flowchart describing a procedure of executive scenario creation to be executed by the executive scenario creation program.
Figure 7:
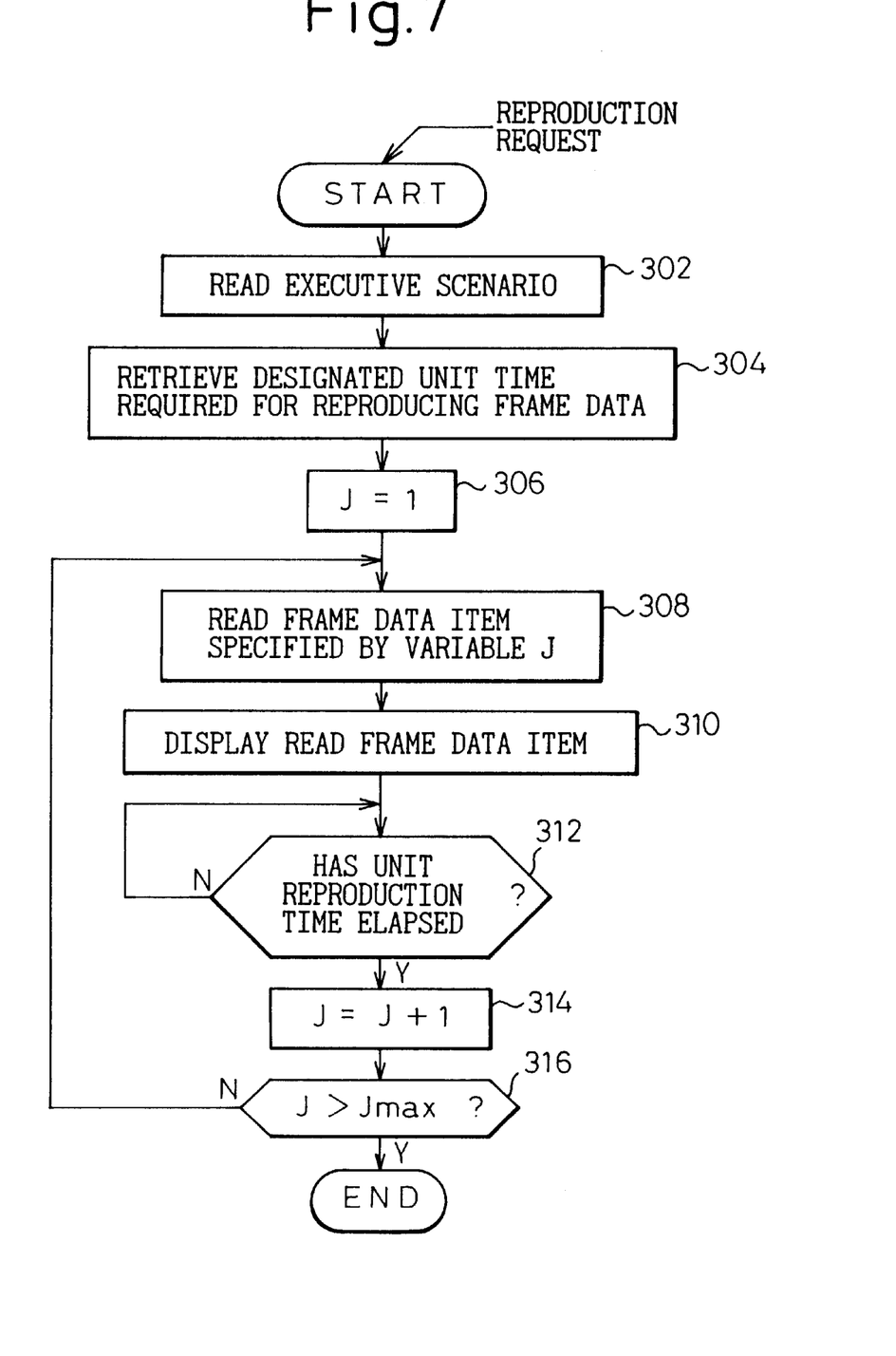
FIG. 7 is a flowchart describing a procedure to be executed by an animation reproduction program.

FIGS. 5 and 6 describe an example of a processing flow to be executed by the executive scenario creation program 40, and FIG. 7 describes an example of a processing flow to be executed by the animation reproduction program 43. The present invention will be explained in detail according to the processing flows.

When a request for setting a unit time required for reproducing frame data, which is to be stored in the unit reproduction time storage memory 42, is issued from a user via the interactive equipment 33, the executive scenario creation program 40 communicates with the user so as to, as described in the processing flow of FIG. 5, set the unit time required for reproducing frame data (step 102) and store the set unit time required for reproducing frame data in the unit reproduction time storage memory 42 (step 104).

Thus, the unit time required for reproducing frame data, for example, 1/60 seconds is stored in the unit reproduction time storage memory 42.

When a request for creating an executive scenario is issued from the user via the interactive equipment 33, the executive scenario creation program 40 first reads, as described in the processing flow of FIG. 6, the scenario 31 of animation at step 202. At step 204, the unit time required for reproducing frame data is retrieved from the unit reproduction time storage memory 42.

At step 206, an initial value 1 is set for a variable I indicating an arranged position of a frame data name in the scenario 31. At step 208, a reproduction tempo recorded or specified at the arranged position indicated by the variable I in the read scenario 31 is identified. With the identification, when the scenario 31 shown in FIG. 3 is taken for instance, the reproduction tempo of 10 FPS of the frame data item A1 is identified.

At step 210, the number of frame data items needed to realize the display time defined by the reproduction tempo identified at step 208 is calculated according to the following expression so that frame data items can be reproduced at intervals of the unit time required for reproducing frame data which is retrieved at step 204:

Number of frame data items=[1/(reproduction tempo)]/(unit time required for reproducing frame data)

In the calculation, for example, when 1/60 seconds is designated as a unit time required for reproducing frame data, if a reproduction tempo of 10 FPS is identified, 6 is calculated as the number of frame data items. When a reproduction tempo of 60 FPS is identified, 1 is calculated as the number of frame data items. When a reproduction tempo of 20 FPS is identified, 3 is calculated as the number of frame data items.

At step 212, a frame data name and visualizing position described in the scenario 31 and specified by the variable I are copied so that the frame data name described in the scenario 31 and specified by the variable I will amount to the number of frame data items calculated at step 210.

The copying will be described by taking the scenario 31 shown in FIG. 3 as an example. The frame data items A1 to A5 for which the reproduction tempo of 10 FPS is set are each copied five times, the frame data items A6 to A10 for which the reproduction tempo of 60 FPS is set are not copied, and the frame data items A11 to A20 for which the reproduction tempo of 20 FPS is set are each copied twice.

At step 214, the frame data name and visualizing position specified by the variable I and the copies of the frame data name and visualizing position produced at step 212 are stored in the executive scenario storage memory 41. At step 216, the variable I is incremented by one. At step 218, it is judged whether or not the variable I has exceeded the maximum value of an arranged position of a frame data name described in the scenario 31. If it is judged that the variable I has exceeded the maximum value, the processing is terminated. If it is judged that the variable I has not exceeded the maximum value, control is returned to step 208.

As mentioned above, the executive scenario creation program 40 reads the scenario 31 of animation described in the form of data sets including names of frame data items, reproduction tempos of the frame data items, and visualizing positions of the frame data items, converts the scenario into a data structure (referred to as an executive scenario) composed of a series of frame data names and visualizing positions of the frame data items, and then stores the data structure in the executive scenario storage memory 41. For example, when the scenario 31 shown in FIG. 3 is read, it is converted into the executive scenario shown in FIG. 8 and then stored in the executive scenario storage memory 41.

On receipt of the executive scenario stored in the executive scenario storage memory 41, the animation reproduction program 43 executes reproduction of an animation projected by the scenario 31 according to the processing flow of FIG. 7.

Specifically, when a request for reproducing an animation projected by the scenario 31 is issued from a user via the interactive equipment 33, the animation reproduction program 43 first reads the executive scenario from the executive scenario storage memory 41 at step 302. At step 304, the unit time required for reproducing frame data is retrieved from the unit reproduction time storage memory 42.

At step 306, an initial value 1 is set for a variable J indicating an arranged position of a frame data name in the read executive scenario. At step 308, a frame data name recorded at the arranged position indicated by the variable J in the read executive scenario is identified. A frame data item having the frame data name is read from the image memory 45.

At step 310, the frame data item read from the image memory 45 is displayed on the display unit 32. The display position is equivalent to the visualizing position. At step 312, the process waits until the unit time required for reproducing frame data which is retrieved at step 304 has elapsed since the start of display. When it is confirmed that the unit time has elapsed, control is passed to step 314. The variable J is then incremented by one. At step 316, it is judged whether or not the variable J has exceeded the maximum value of an arranged position of a frame data name in the executive scenario. If it is judged that the variable J has exceeded the maximum value, the processing is terminated. When it is judged that the variable J has not exceeded the maximum value, control is returned to step 308.

As mentioned above, the animation reproduction program 43 detects whether or not a cycle of a designated unit time required for reproducing frame data has elapsed. When it is detected that the cycle has elapsed, a frame data name is retrieved in order from the executive scenario. A frame data item having the frame data name is displayed on the display unit 32. Thus, an animation is reproduced.

Figure 8:
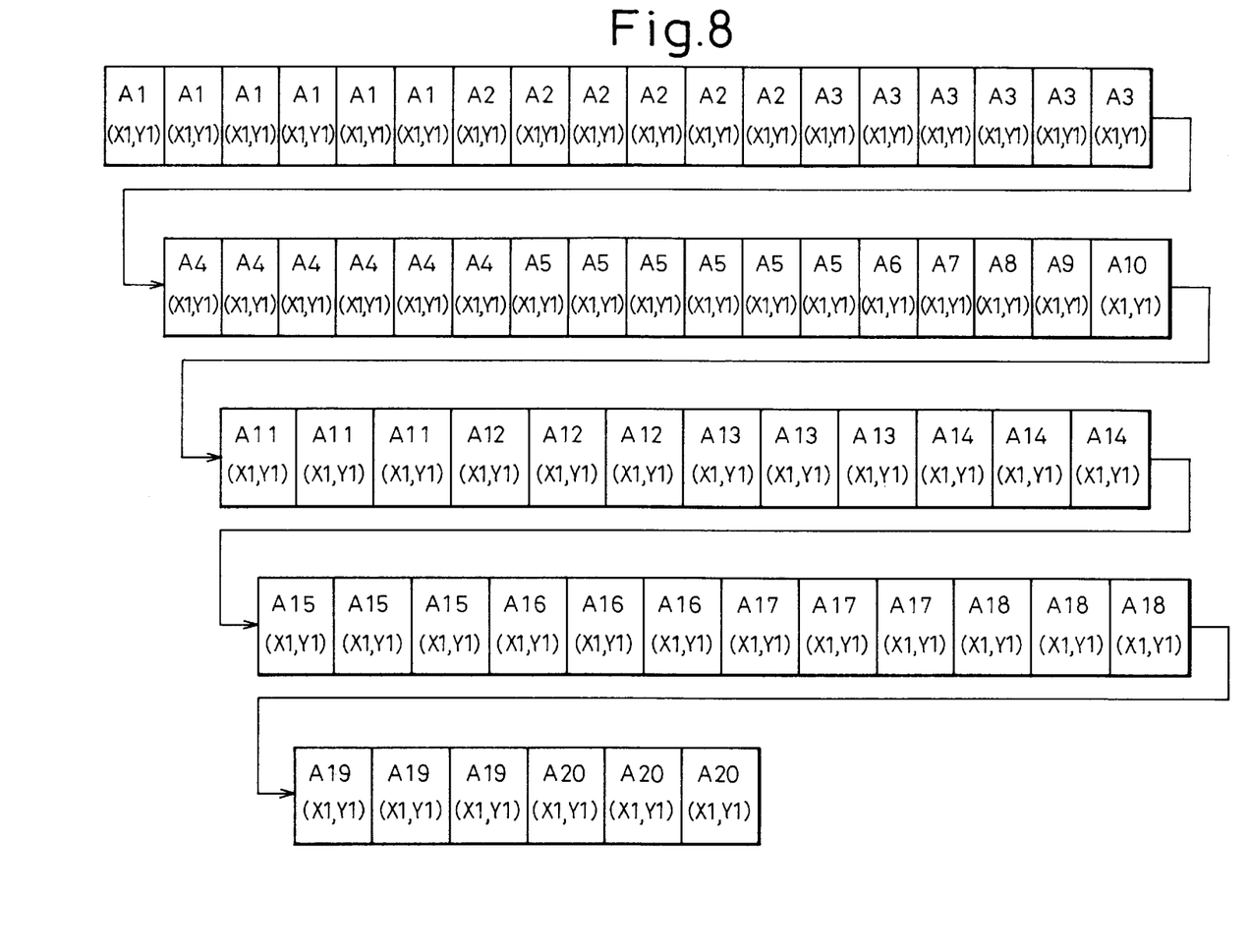
FIG. 8 is an explanatory diagram concerning an executive scenario.

For example, when the scenario shown in FIG. 8 is taken as an example, the frame data items A1 to A5 are each displayed six times at intervals of 1/60 seconds, the frame data items A6 to A10 are each displayed once at intervals of 1/60 seconds, and the frame data items A11 to A20 are each displayed three times at intervals of 1/60 seconds. Thus, an animation is reproduced.

The present invention has been described in conjunction with the illustrated embodiment. The present invention is not limited to the embodiment. For example, in the embodiment, frame data items to be reproduced are described in the form of frame data names. Alternatively, the frame data items to be reproduced may be described in the form of memory addresses.

As described so far, according to the present invention, when animation reproduction is executed, all that is needed is to monitor whether or not a cycle of a unit time required for reproducing frame data has elapsed. Consequently, even when a plurality of animations are reproduced concurrently, an increase in load required for the reproduction can be suppressed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An animation creating method for creating an executive scenario of animation, comprising:

inputting a scenario of animation described in the form of at least paired data including identifiers of frame data items constituting an animation and corresponding reproduction tempos of the frame data items, each reproduction tempo providing the amount of time to display the associated frame data item;

calculating, for each of the identifiers of frame data items described in the scenario, the number of times to reproduce each frame data item to realize the corresponding reproduction tempo, said calculating using the reproduction tempo and a designated unit time required for displaying any one frame data item; and creating an executive scenario of animation without reproduction tempos, the executive scenario containing at least a series of identifiers of frame data items by copying, for each of the identifiers of frame data items described in the scenario, a number of identifiers of frame data items such that the number of frame data item identifiers is the same as the calculated number of frame data items.

2. An animation reproducing method for reproducing an executive scenario of animation composed of at least a series of identifiers of frame data items, comprising:

detecting whether a cycle of a designated unit time required for reproducing frame data has elapsed;

retrieving, when it is judged that the cycle of the designated unit time required for reproducing frame data has elapsed, an identifier of a frame data item in order from the executive scenario, the number of frame data items associated with each identifier being a number needed to realize a reproduction tempo associated with the identifier according to the designated unit time; and giving control so that a frame data item indicated by the retrieved identifier of a frame data item can be displayed on a display unit, wherein the executive scenario does not include reproduction tempos.

3. An animation creating system for creating an executive scenario of animation, comprising:

an input unit inputting a scenario of animation described in the form of at least paired data including identifiers of frame data items constituting an animation and corresponding reproduction tempos of the frame data items, each reproduction tempo providing the amount of time to display the associated frame data item;

a calculating unit calculating, for each of the identifiers of frame data items described in the scenario input by said input unit, the number of times to reproduce each frame data item to realize the corresponding reproduction tempo, said calculating using the reproduction tempo and a designated unit time required for displaying any one frame data item; and a creating unit creating an executive scenario of animation without reproduction tempos, the executive scenario containing at least a series of identifiers of frame data items by copying, for each of the identifiers of frame data items described in the scenario input by said input unit, a number of identifiers of frame data items such that the number of frame data item identifiers is the same as the number of frame data items calculated by said calculating unit.

4. An animation reproducing system for reproducing an executive scenario of animation composed of at least a series of identifiers of frame data items, comprising:

a detecting unit detecting whether a cycle of a designated unit time required for reproducing frame data has elapsed;

a retrieving unit retrieving an identifier of a frame data item, in orde,r from the executive scenario when it is judged by said detecting unit that the cycle of the unit time required for reproducing frame data has elapsed, the number of frame data items associated with each identifier being a number needed to realize a reproduction tempo associated with the identifier according to the designated unit time; and a display control unit giving control so that a frame data item indicated by the identifier of a frame data item retrieved by said retrieving unit can be displayed on a display unit, wherein the executive scenario does not include reproduction tempos.

5. A recording medium readable by an animation creating system for creating an executive scenario of animation, said recording medium storing a program implementing:

an input facility inputting a scenario of animation described in the form of at least paired data including identifiers of frame data items constituting an animation and corresponding reproduction tempos of the frame data items each, reproduction tempo providing the amount of time to display the associated frame data item;

a calculating facility calculating, for each of the identifiers of frame data items described in the scenario input by said input facility, the number of times to reproduce each frame data item to realize the corresponding reproduction tempo, said calculating using the reproduction tempo and a designated unit time required for displaying any one frame data item; and a creating facility creating an executive scenario of animation without reproduction tempos, the executive scenario containing at least a series of identifiers of frame data items by copying, for each of the identifiers of frame data items described in the scenario input by said input facility, a number of identifiers of frame data items such that the number of frame data item identifiers is the same as the calculated number of frame data items.

6. A recording medium readable by an animation reproducing system for reproducing an executive scenario of animation composed of at least a series of identifiers of frame data items, said recording medium storing a program implementing:

a detection facility detecting whether a cycle of a designated unit time required for reproducing frame data has elapsed;

a retrieval facility retrieving an identifier of a frame data item, in order, from the executive scenario when it is judged by said detection facility that the cycle of the designated unit time required for reproducing frame data has elapsed, the number of frame data items associated with each identifier being a number needed to realize a reproduction tempo associated with the identifier according to the designated unit time; and a display control facility giving control so that a frame data item indicated by the identifier of a frame data item retrieved by said retrieval facility can be displayed on a display unit, wherein the executive scenario does not include reproduction tempos.

7. A method for creating an animation executive scenario, comprising:

inputting an animation scenario including frame data items and corresponding reproduction tempos for each of the frame data items, each reproduction tempo providing the amount of time to display the associated frame data item; and creating an animation executive scenario having a series of frame data items wherein the executive scenario does not include the reproduction tempos, the number of executive scenario frame data items determined by calculating, for each of the input frame data items, the number of executive scenario frame data items needed to realize the reproduction tempo of each input frame data item according to a designated unit time required for reproducing frame data.

8. A method for reproducing an animation executive scenario containing a series of frame data items with identifiers, wherein each of the frame data items does not include a reproduction tempo, comprising:

detecting when a cycle of a designated unit time required for reproducing frame data has elapsed; and retrieving and displaying the next frame data item from the executive scenario when the cycle of unit time has elapsed, the number of frame data items associated with each identifier being a number needed to realize a reproduction tempo associated with the identifier according to the designated unit time.

* * * * *

UNITED STATES PATENT AND TRADEMARK OFFICE
CERTIFICATE OF CORRECTION

PATENT NO. : 6,160,558
DATED : December 12, 2000
INVENTOR(S) : Kunio Motegi

It is certified that error appears in the above-identified patent and that said Letters Patent is hereby corrected as shown below:

<u>Column 8,</u>
Line 21, change "orde,r" to -- order, --.

Signed and Sealed this

Second Day of October, 2001

*Attest:*

*Attesting Officer*

NICHOLAS P. GODICI
*Acting Director of the United States Patent and Trademark Office*